(12) United States Patent
Taylor (10) Patent No.: US 6,691,241 B1
(45) Date of Patent: Feb. 10, 2004

(54) DELAY TUNING TO IMPROVE TIMING IN MULTI-LOAD SYSTEMS

(75) Inventor: Gregory F. Taylor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/469,848

(22) Filed: Dec. 21, 1999

(51) Int. Cl.⁷ .................................. G06F 1/04
(52) U.S. Cl. ...................... 713/500; 713/400
(58) Field of Search ................ 713/400, 401, 713/500, 501, 502, 503, 600; 326/93, 96; 327/291, 295; 710/58

(56) References Cited

U.S. PATENT DOCUMENTS 4,541,100 A * 9/1985 Sutton et al. ............... 375/224
5,367,526 A * 11/1994 Kong ......................... 714/805
6,316,961 B2 * 11/2001 Kanetani et al. ............. 326/98

* cited by examiner

*Primary Examiner*—Thomas Lee
*Assistant Examiner*—Thuan Du
(74) *Attorney, Agent, or Firm*—Blakely, Sokoloff, Taylor & Zafman LLP (57) ABSTRACT

A shared bus multiprocessor system is provided. The system comprises a communications bus, a first processor, a second processor, and a clock. The first processor has a first output buffer that has a first output delay time. The second processor has a second output buffer that has a second output delay time. The second output delay time is less than the first output delay time. Finally, the clock provides a clock signal to the first and second processors, with the clock signal arriving at the second processor before the first processor.

17 Claims, 7 Drawing Sheets

DELAY TUNING TO IMPROVE TIMING IN MULTI-LOAD SYSTEMS

FIELD OF THE INVENTION

The present invention relates generally to a high frequency shared bus multiprocessor system, and more particularly, to a method for coordinating timing of communications to allow for high frequency operation of the multiprocessor system.

BACKGROUND OF THE INVENTION

Integrated circuits can be connected to an external communication bus and traditionally include an output buffer. An output buffer is also referred to as a driver circuit. An output buffer is typically characterized by a delay time experienced from applying a clock signal to an input of the buffer until valid data is provided at an output. This delay time is often referred to as Tco (time from clock to output). The performance of an integrated circuit/communication bus is limited, among other things, by the variation in Tco. In general, if Tco is too long, then the system operating frequency is reduced to allow time for the driven output to arrive at a receiver connected to a remote end of the communication bus. If the delay is too short, the output may arrive at the receiver too quickly. Thus, variations in Tco need to be controlled to remain between the two limits imposed by the system and its design targets.

An output buffer that allows the output buffer delay time to be dynamically controlled would be advantageous. One application of such an output buffer would be a shared bus multiprocessor system. Output buffers that have a fixed delay time that are used in multiprocessor systems require that the multiprocessor system be designed with a limitation on the minimum amount of wire that can appear between neighboring processors. This wire is needed to maintain minimum delays between processors in order to meet predetermined hold times.

In another architecture, a network of "point-to-point" interconnections replaces the shared bus. However, this makes the architecture much more complex and has been difficult to implement in practice.

SUMMARY OF THE INVENTION

A shared bus multiprocessor system is provided. The system comprises a communications bus, a first processor, a second processor, and a clock. The first processor has a first output buffer that has a first output delay time. The second processor has a second output buffer that has a second output delay time. The second output delay time is less than the first output delay time. Finally, the clock provides a clock signal to the first and second processors, with the clock signal arriving at the second processor before the first processor.

DETAILED DESCRIPTION OF THE INVENTION

In the following detailed description of the preferred embodiment, references made to the accompanying drawings which form a part hereof, and which is shown by way of illustration specific preferred embodiments in which the inventions may be practiced. These embodiments are described in sufficient detail to enable those skilled in the art to practice the invention. It is to be understood that other embodiments may be utilized and that logical, mechanical and electrical changes may be made without departing from the spirit and scope of the present invention. The following detailed description is not to be taken in a limiting sense, and the scope of the present invention is defined only by the appended claims.

Figure 1:
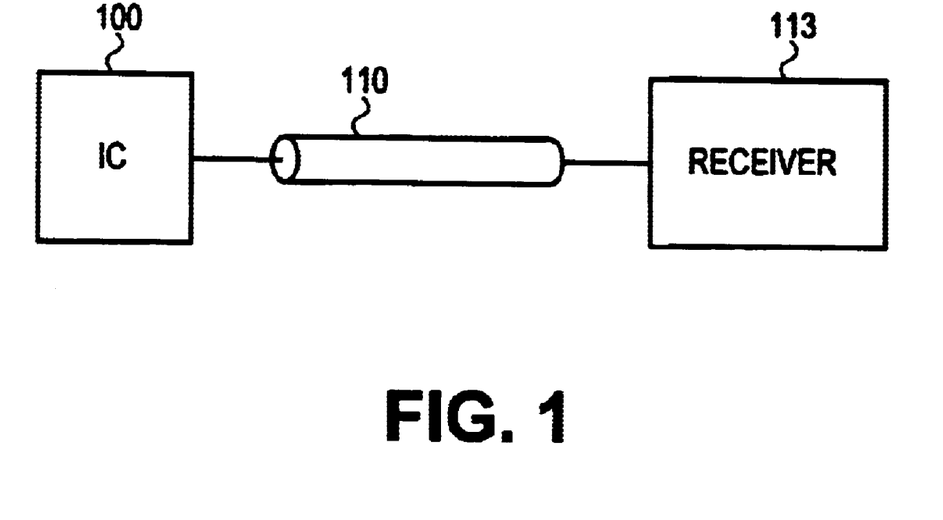
FIG. 1 is an integrated circuit coupled to a communications bus.

Referring to FIG. 1, an integrated circuit 100 of the present invention is coupled to a communication line, or bus, 110. A remote end of the bus is coupled to a receiver circuit 113. It will be appreciated that numerous receivers can be coupled to the bus, and that the remote end of the bus may be terminated with circuitry other than a receiver. The bus is illustrated generally as a conductor that is characterized by an impedance and length.

Figure 2:
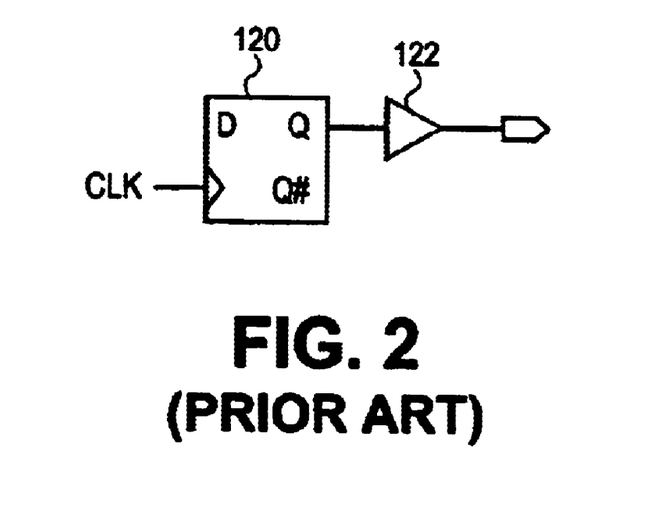
FIG. 2 illustrates a prior art integrated circuit output buffer.

As shown in FIG. 2, in one embodiment of a prior art integrated circuit output buffer, data is taken from a flip-flop circuit 120 and directly driven from the integrated circuit device using the driver circuit 122. In another embodiment, the buffer circuit may include some impedance or slew rate control circuitry (not shown). Although impedance and slew rate control circuitry may improve Tco variation, they do not substantially eliminate it. In comparison, the present invention permits improvement to the prior art in the Tco time window. As explained below, the present invention allows the Tco timing to be set dynamically, allowing an integrated circuit to use the optimal setting for the process, voltage, and temperature (PVT) variations under which it is operating.

Figure 3:
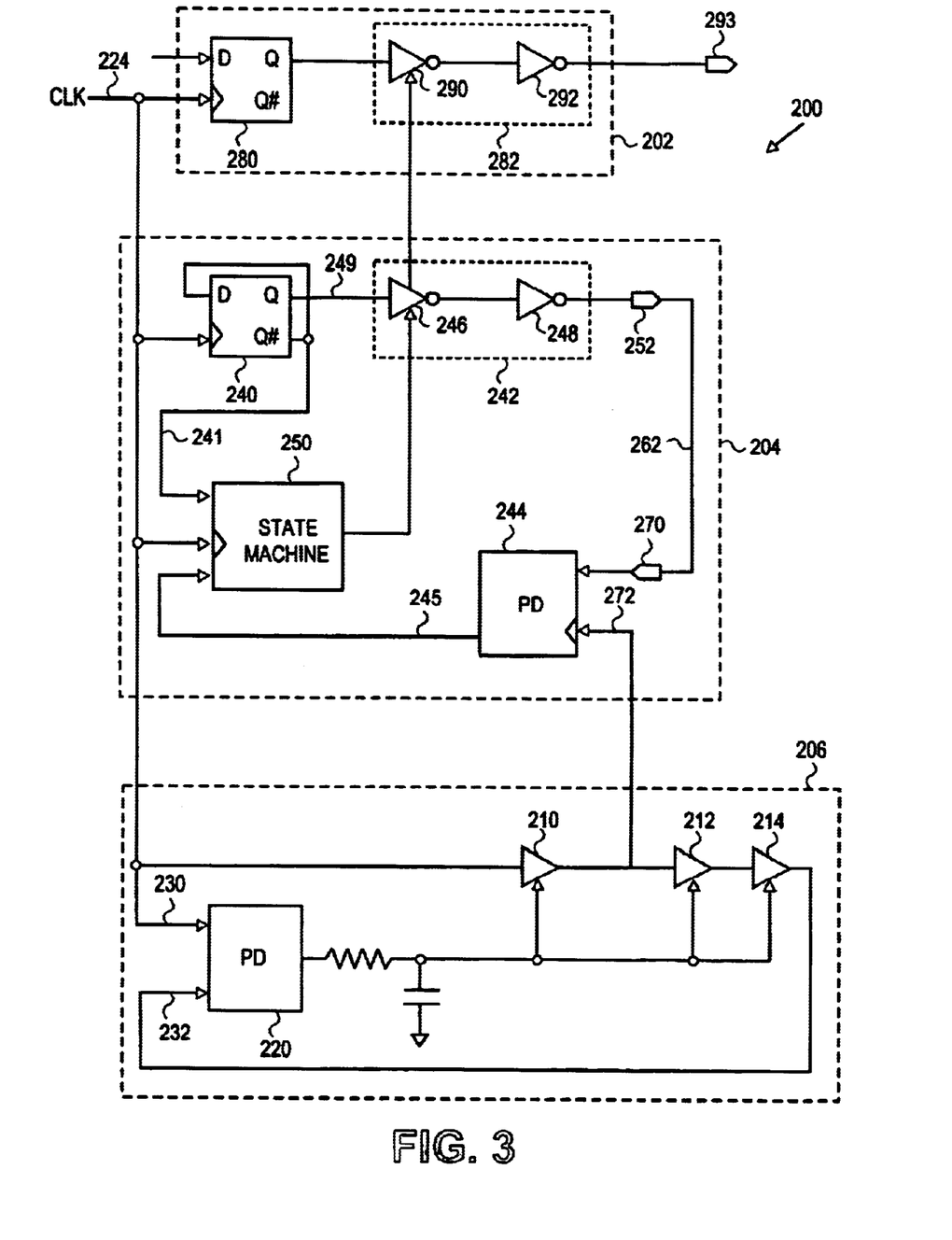
FIG. 3 illustrates one embodiment of an output buffer and control circuitry used in the present invention.

Referring to FIG. 3, one embodiment of an output buffer and control circuitry 200 of the present invention is illustrated. The circuitry comprises three sub-circuits: (1) an output buffer 202 with a controllable output delay time, (2) a reference output buffer and feedback control 204, and (3) an optional synchronous delay line 206.

The synchronous delay line 206 includes three controllable delay circuits 210, 212, and 214 coupled to a phase detector 220. The delay circuits are three identical controllable delay elements coupled in series. A bus clock signal 224 is coupled to an input of the first delay circuit 210. The clock signal 224 is delayed by the delay elements 210, 212, and 214 and the phase detector (PD) 220 compares the arrival times of the rising edge of the bus clock signal 224 at input 230 and a predecessor bus clock signal rising edge delayed by the three delay elements at input 232. If the delayed clock rising edge arrives at input 232 of the phase detector 220 before the subsequent clock rising edge, then the phase detector 220 increases the delay of the delay elements. If the delayed clock rising edge arrives at the phase detector 220 after the subsequent clock rising edge, then the phase detector 220 decreases the delay of the delay elements 210, 212, and 214. In this manner, the sum of the three delay elements 210, 212, and 214 is controlled to match a full clock cycle.

The output of the first delay element 210, therefore, is a clock signal delayed by ⅓ of a clock cycle. In one embodiment, the bus clock signal 224 operates with a cycle time of 7.5 nanoseconds. Thus, the delay element 210 generates a reference signal 272 having a 2.5 nanosecond delay. It will be appreciated that the exact delay values depend upon the integrated circuit, and there may be applications where no synchronous delay line is needed, as explained below.

The reference output buffer 204 comprises a flip-flop circuit 240, output buffer 242, phase detector 244, and a state machine 250. The flip-flop 240 drives a delay tuning buffer 246 which drives an output driver 248 that is coupled to a reference external output pin 252. The output pin 252 drives a length of wire 262 which conveys the output signal back to an external input pin 270. Wire 262 can be any conductive, semiconductive, or electronic signal path, including but not limited to a conductive trace, polysilicon, and fiber optic. Upon arriving at the input pin 270, the arrival time of the reference output is compared with the reference clock signal on input connection 272. The reference clock signal is generated by the synchronous delay line 206 in this example, using phase detector 244. The output of the phase detector 244 is used by the state machine 250 to make sure that a cumulative delay through the output buffer circuitry 242, Tco, plus the relatively fixed wire delay is equal to one third of the clock cycle. If the signal arrives at the phase detector 244 early, the delay of the delay tuning buffer 246 is increased. Conversely, the delay is decreased if the signal arrives at the phase detector 244 late. Note that flip-flop circuit 240 is coupled to toggle a signal at output Q 249 on each clock signal on node 224 rising edge. The output signal Q 249, therefore, toggles at a frequency of one half of the clock signal. The delay time selected can be described as 1/N of the input clock cycle. It will be appreciated that the integer N is selected based upon the data frequency and the delay of the circuitry used in the output buffer circuitry.

The present invention compares an imprecise output buffer delay from circuit 242 with a more precise clock delay, and uses the result of the comparison to control the output delay. Although wire delays are more precise than output delays, and are independent of the process, voltage, and temperature variations of the output buffer, wire delays still have some variation.

In the embodiment described, the synchronous delay line circuit permits a smaller wire delay to be used by generating the delay of 1/N of the clock cycle. If a longer fixed delay (wire delay) were used, the wire delay error would increase. That is, the total wire delay error is directly proportional to the length of the wire 262 connected between external connections 252 and 270. If the error in the external wire is not of concern, the delay line circuit 206 can be eliminated. Further, the clock signal 224 is input into the phase detector circuit 244 instead of reference signal 272. In this embodiment, state machine 250 adjust circuits 246 and 290 in response to the cumulative delay of the variable 242 and fixed 262 delay circuits of the reference circuit.

Output buffer 202 illustrated in FIG. 3 uses the same output delay tuning setting that is generated in the reference output buffer and delay loop circuit. That is, the output buffer includes flip-flop 280 and output circuitry 282. The output circuitry 282 is substantially the same as buffer circuit 242. Delay tuning buffer 290 is the same as delay tuning buffer 246 and uses the same output control setting from state machine 250. Likewise, driver 292 is fabricated the same as driver 248.

In one embodiment, this control setting from the state machine 250 is a digital value, which allows for easy distribution around the integrated circuit. Alternatively, an analog control delay line can be provided in another embodiment. Because the output buffer 202 and reference output buffer 204 use the same circuitry on the same circuit die, the delay tuning value that controls the reference output buffer 204 provides an optimal delay tuning value for the "normal" output buffers 202.

Figure 4:
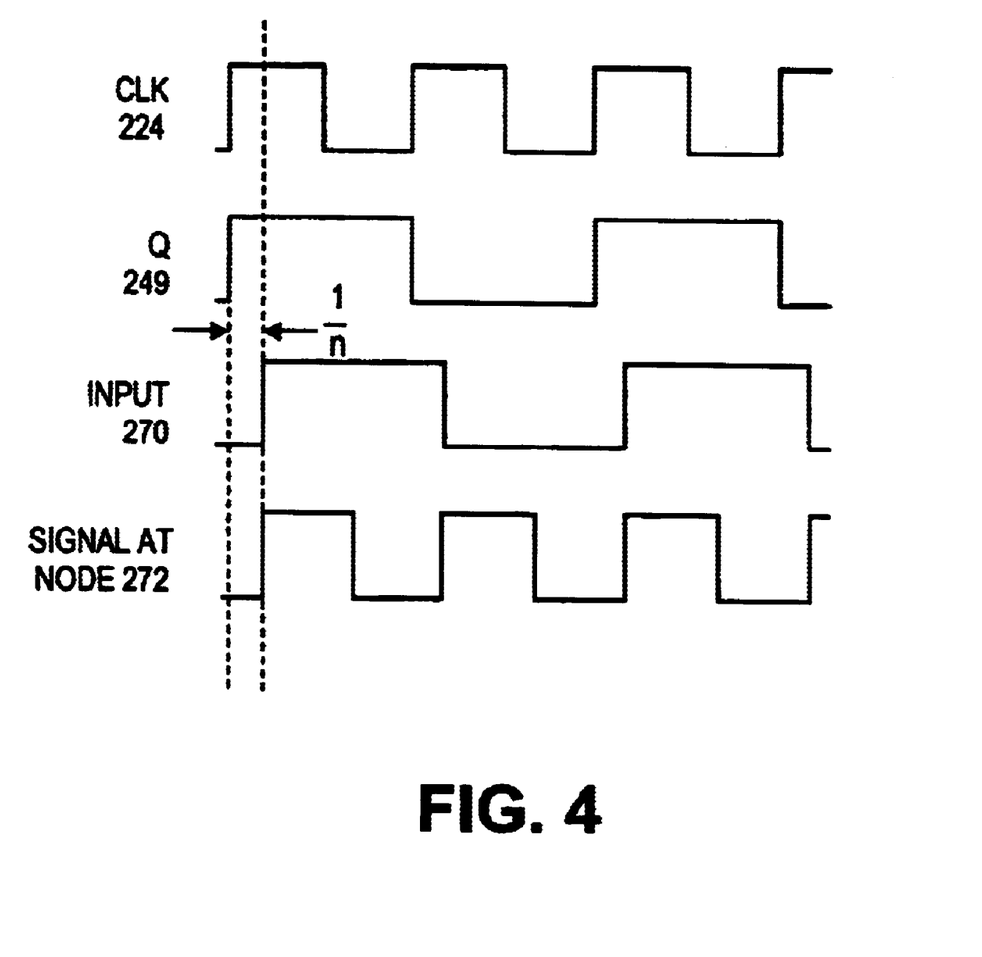
FIG. 4 is a timing diagram of signals of the circuitry of FIG. 3.

FIG. 4 illustrates one example timing diagram of the embodiment illustrated in FIG. 3. As illustrated, the CLK signal on node 224 provides an output signal Q 249 that has one half the frequency of the clock signal. This signal is delayed by circuit 242 and wire 262 to provide an input signal on connection 270 which is delayed by one third the clock frequency. That is, the signal at node 272 is used to control the delay at node 270. It will be appreciated by those skilled in the art that the delay of ⅓ of a clock cycle can be changed without departing from the present invention. Thus, any fraction of the clock cycle can be used, such as, but not limited to, ⅛, ¼, ½, ⅔, or ¾. Further, synchronous delay circuit 206 can be eliminated and the delay of circuit of 204 can be calibrated using the state machine.

Both the output buffer circuit 202 and the reference circuit 204 include an adjustable buffer circuit 290 and 246, respectively. The embodiment illustrated also includes output driver circuits 248 and 292. The driver circuits are used because it can be more expensive to fabricate a variable delay driver circuit than a variable buffer coupled to a driver circuit. Also, the input impedance of the driver circuit 292 is more predictable than the impedance at the external connection 293.

Figure 5:
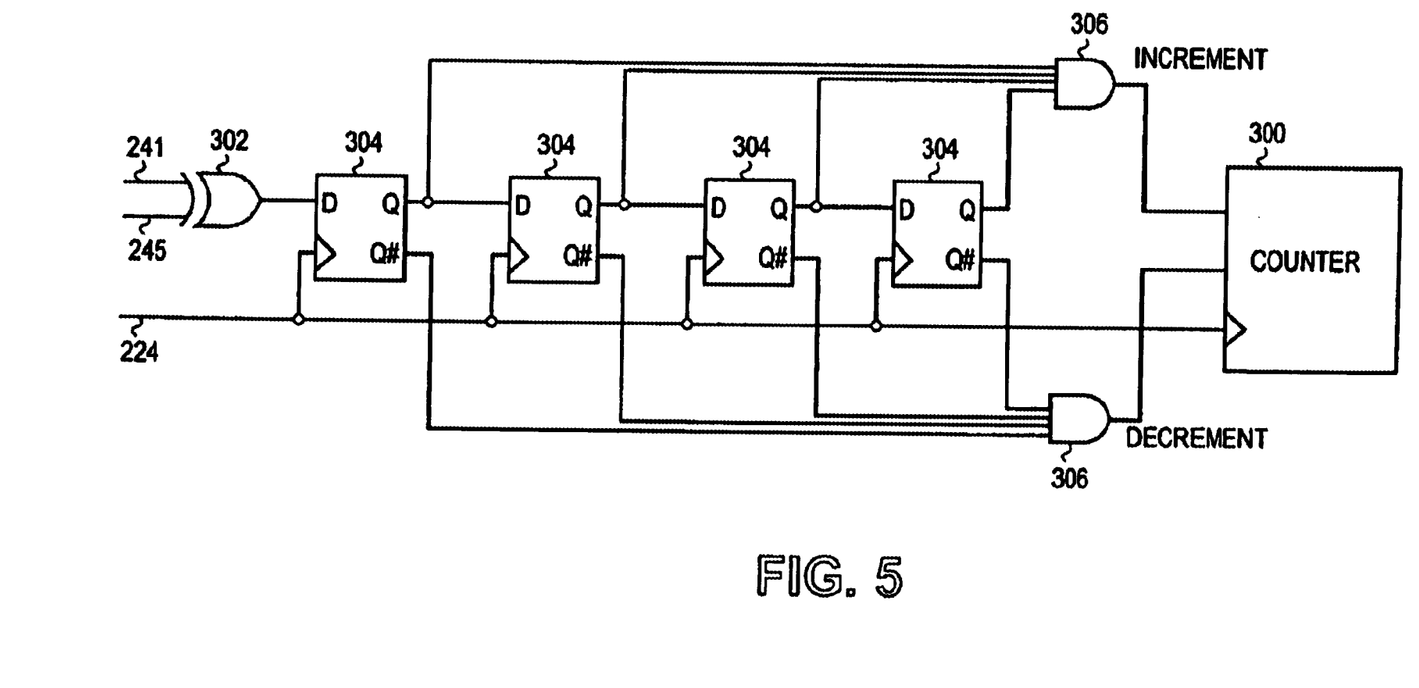
FIG. 5 illustrates one embodiment of a state machine used by the circuitry of FIG. 3.

FIG. 5 illustrates one embodiment of state machine 250. The state machine includes a counter 300, an input XNOR gate 302, series coupled flip-flop circuits 304, and a pair of AND gates 306. The state machine 250 compares the values present on nodes 241 and 245 to determine if the delay of the reference output 248 is too slow or too fast. If the output delay through 249, 242, 252, 262, 270, 244, and 245 is less than 1/N of a clock cycle, then on the next rising clock, node 241 and 245 will differ. If the loop delay is greater than 1/N of a clock cycle, these values will match at a subsequent rising clock edge. In order to reduce the response to noise, the comparison of nodes 241 and 245 is then filtered through the flip-flop circuits 304 for several clock cycles. If several comparisons in a row agree in the direction of the error (too slow or too fast), then the counter that controls the delay of the delay lines is incremented or decremented (using the AND gates) to correct the delay.

The output buffer 200 of FIG. 3 provides a correction of Tco that requires more time than the output delay. Thus, output delay variations caused by low frequency effects (PVT variation) are dynamically corrected. There are two dominant terms in Tco variation: (1) PVT effects, (2) simultaneous switching output (SSO) effects. The output buffer of FIG. 3 compensates for the PVT effects. The magnitude of each type of variation can be explained with the following example.

Assume that, $Tco_{max}$=2.82 nanoseconds, $Tco_{min}$=1.33 nanoseconds, and $Tco_{max-min}$=0.77 nanoseconds. $Tco_{max}$ and Tco$_{min}$ are the maximum and minimum Tco times that are measured under any set of PVT conditions. Tco$_{max-min}$ is the difference between the maximum and minimum Tco measured under a single set of PVT conditions. As such, SSO and high-frequency voltage effects dominate Tcomax-min. If it is assumed that none of the variations measured in Tco$_{max-min}$ can be compensated by the present invention, then the variation that can be compensated for is the remaining variation of 0.72 nanoseconds (Tco$_{max}$–Tco$_{min}$–Tco$_{max-min}$).

Figure 6:
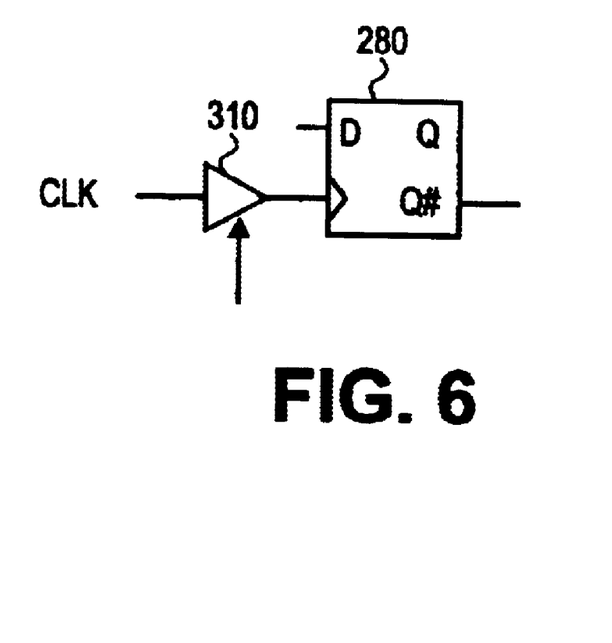
FIG. 6 is an alternate embodiment of portions of an output buffer of FIG. 3.
Figure 7:
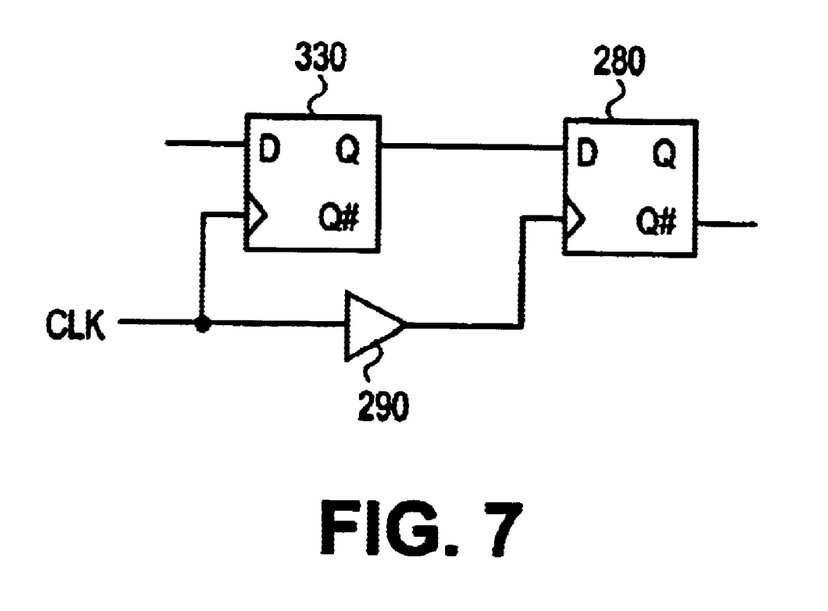
FIG. 7 is an alternate embodiment of portions of an output buffer of FIG. 3.

FIGS. 6 and 7 illustrate alternate embodiments of the output driver circuit. In the embodiment of FIG. 6, the flip-flop 280 and the delay tuning buffer 290 are replaced with a flip-flop 280 and a non-inverting delay tuning buffer 310 which is coupled such that the delay tuning buffer 310 is coupled to the clock input connection of the flip-flop circuit 280. The output of the flip-flop 280 is then taken from the Q# connection, not the Q connection. From an output perspective, the circuit of FIG. 6 is equivalent to the circuitry described above in FIG. 3. The input (set up and hold ) of the circuit, however, is different from that described above. To overcome this difference, a flip-flop circuit 330 can be added to the input connection of flip-flop circuit 280, as shown in FIG. 7.

The output buffer circuit 200 described above has an adjustable delay time Tco. A reference output buffer has also been described which includes an adjustable delay time and a fixed delay time. In one embodiment, a synchronous delay line circuit provides a reference signal having a predetermined delay time. The reference output buffer uses the reference signal from the synchronous delay line circuit to set a cumulative delay time for the reference output buffer equal to the predetermined delay time. The reference output buffer circuit is coupled to the output buffer circuit such that the adjustable delay time of each circuit is set to an equal delay time.

The output buffer 200 described above can be advantageously used in a shared bus multiprocessor system. As previously noted, conventional shared bus multiprocessor systems require that a minimum amount of wire appear between neighboring processors. This wire is needed to maintain minimum delays between processors in order to meet hold times. The hold time is the amount of time required by a receiver (at the processor) after a clock edge before the receiver can guarantee receipt of data from the communications bus. The excess wire is needed to ensure that a signal from a neighboring processor is not received too quickly. However, by the use of output buffers 200 that have adjustable output delay times Tco in each of the microprocessors, this requirement can be relaxed or eliminated allowing for higher operating frequencies of multiprocessor systems.

Figure 8:
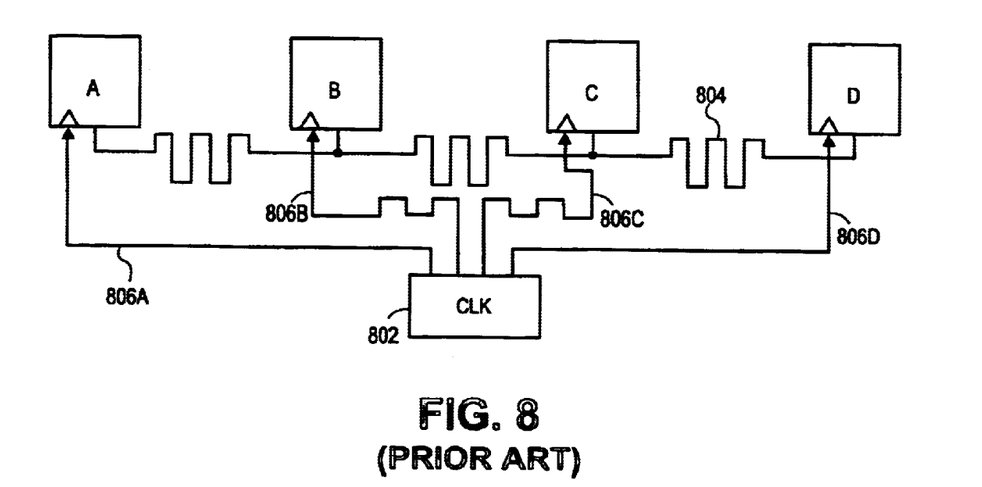
FIG. 8 is a prior art shared bus multiprocessor system.

FIG. 8 shows a prior art multiprocessor system designed so that the clock signal from clock 802 arrives simultaneously at all of the processors A, B, C, and D. Note that clock lines 806a, 806b, 806c, and 806d all have equal lengths. All of the processors A–D have the same output delay times Tco and the same set up time period. The set up time is the amount of time data must arrive at the receiver of a microprocessor prior to a clock edge. Each of the processors A–D are connected to a bus 804. As mentioned previously, the minimum output delay times Tco and input hold times determine the minimum amount of wire that must appear between adjacent processors. Note that the bus 804 typically includes termination resistors (not shown) at each termination of the bus 804 to eliminate signal reflections.

Note that in FIG. 8, there is excess wire between each of the processors A–D. The excess wire needed between processors A and B, B and C, and C and D increases the total amount of wire that separates the most distant pair of processors (A and D). This limits the maximum operating frequency of the system. Other topologies can reduce this wire length, but they do so at the cost of reduced bus impedance and increased reflections and noise.

Figure 10:
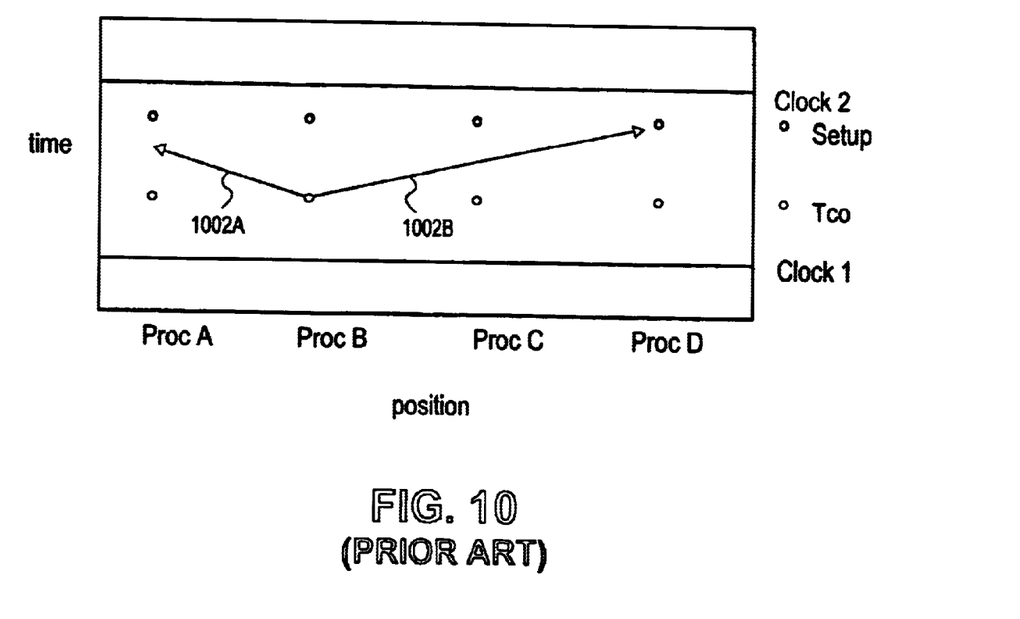
FIG. 10 is a timing diagram of the shared bus multiprocessor system of FIG. 8.

FIG. 10 shows the timing of the multiprocessor system of FIG. 8. The horizontal axis is position along the bus 804 connecting the processors A–D. The vertical axis is time. In this system as noted above, a first clock edge CLOCK1 arrives at all four processors A–D simultaneously. Each processor drives its output with the same timing, designated on FIG. 10 as Tco. In other words, each of the processors A–D have identical fixed output delay buffers that have the same Tco.

Assume now that processor B wishes to drive a signal onto the bus 804. In FIG. 10, processor B is shown driving an output at time Tco, represented by the diagonal lines 1002a and 1002b that show a signal propagating. The slope of the lines are proportional to the velocity of propagation along the bus 804. In this example, the signal driven by processor B arrives at processor C well before the point in time needed by processor C to set up (designated as SETUP in FIG. 10), while barely making it to processor D. Note that the difference between SETUP and Clock2 is the set up time required by the receivers at processors A–D.

However, if processor A had been driving an output at Tco, the signal, which would have the same velocity and thus the same slope in this diagram as the output from processor B, would not arrive at processor D in time to set up its input. Thus, this system would not be functional. The only way to make this system functional would be to slow down the operating frequency, in effect moving the subsequent clock signal CLOCK2 further vertical (later in time). This would pull up the SETUP point and allow the signal to make it to processor D.

Figure 9:
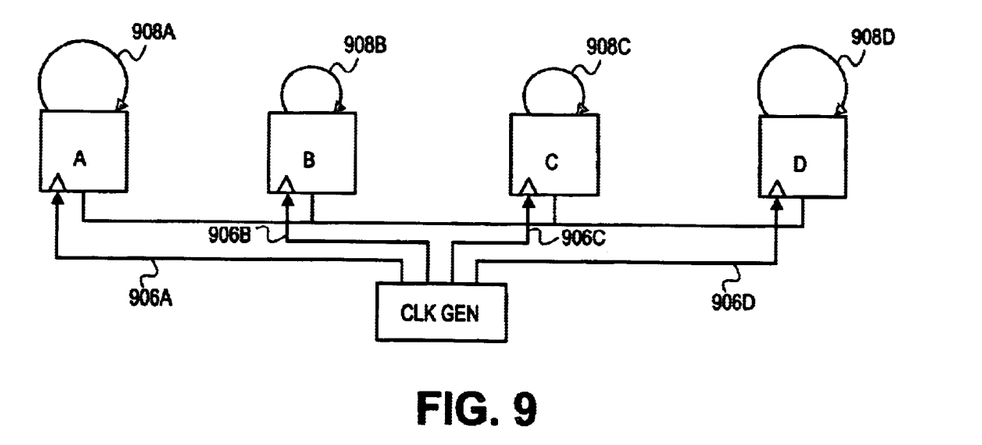
FIG. 9 is a shared bus multiprocessor system formed in accordance with the present invention.

In accordance with the present invention, the output buffers 200 are used to solve this problem. Turning to FIG. 9, a shared bus multiprocessor system in accordance with the present invention is shown. In the preferred embodiment, the lengths of the clock lines 906a, 906b, 906c, and 906d to the individual processors A–D have been tuned so that processors B and C receive their clock signal sooner than processors A and D. This means that their inputs are sampled sooner, reducing their hold time requirements. This in turn means that they do not need to be separated from their neighbors by as much wire in order to guarantee their hold times. The output delays Tco of the individual processors A–D are also tuned by tuning the output delays of their output buffers 200.

Processors A and D deliver the minimum Tco, while processors B and C have their output timings Tco deliberately delayed. The amount of increase in Tco delay is equal to the amount by which their input clocks have been advanced (by receiving the clock signal sooner), plus the propagation time necessary from processor A to B or from D to C.

Additionally, each of the processors have a delay tuning mechanism 908a–d that is used to equalize the total delay. Note that processors B and C have the smallest delay tuning mechanism 908b–c, while processors A and D have a larger delay tuning mechanism 908a and 908d. In the preferred embodiment, for each processor, the sum of their delay tuning mechanism and their Tco should be nearly equal for all processors. Further, in the preferred embodiment, the delay tuning mechanism may be as simple as a wire trace having a predetermined length.

Figure 11:
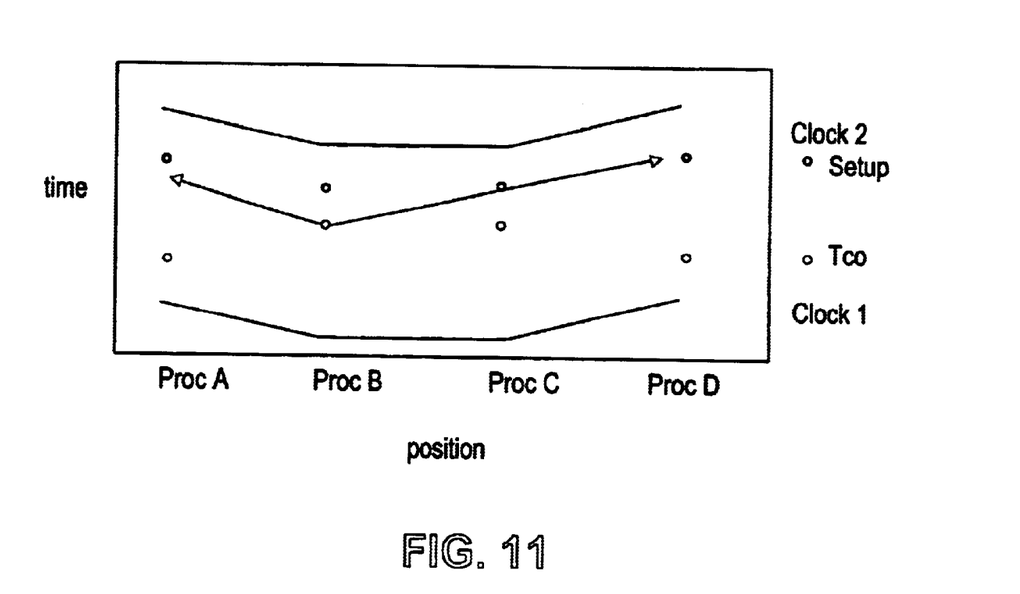
FIG. 11 is a timing diagram of the shared bus multiprocessor system of the present invention.

FIG. 11 shows the system timing of the multiprocessor system of FIG. 9. In this system, when processor B drives an output it arrives at processor C at the same time as an output driven from processor A. Because of this property, no extra wire is needed between these processors in order to guarantee that minimum delay and hold times are satisfied. This permits systems to be smaller, which in turn makes it more reasonable for signal to propagate from processor A to processor D in a single clock cycle.

In the preferred embodiment, the difference in the output delay times Tco between processor B and C (the "slow output delay time") and processors A and D is referred to as the difference output delay time. Preferably the difference output delay time is equal to the difference in arrival time of clock signals between processors B and C and processors A and D plus the signal propagation time between processor B and processor A.

Although specific embodiments have been illustrated and described herein, it will be appreciated by those of ordinary store in the art that any arrangement that is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A shared bus multiprocessor system comprising:
  a communications bus;
  a first set of processors connected to said communications bus, each of said processors in said first set of processors having an output buffer that has an output delay time;
  a second set of processors connected to said communications bus, each of said processors in said second set of processors having a slow output buffer that has a slow output delay time that is greater than said output delay time; and
  a clock that provides a clock signal to each of said processors in said first and second set of processors, said clock signal arriving at said second set of processors before said first set of processors.

2. The system of claim 1 wherein said slow output delay time is greater than said output delay time by a difference output delay time and said clock signal arrives at said second set of processors before said first set of processors by a difference clock time, said difference output delay time being substantially equal to said difference clock time plus a propagation time along said communications bus between said second set of processors and a nearest processor selected from said first set of processors.

3. The system of claim 2 wherein said output buffer comprises:
  output buffer circuitry with a controllable delay time;
  reference output buffer circuitry with a controllable reference delay time; and
  a synchronous delay circuit coupled to the reference output buffer circuitry, the synchronous delay circuit providing a reference clock signal to the reference output buffer circuitry, the reference clock signal calibrating the delay time of both the reference output buffer circuitry and the output buffer circuitry to said controllable reference delay time.

4. The system of claim 1 wherein said output buffer comprises:
  output buffer circuitry with a controllable output delay time;
  reference output buffer circuitry with a controllable reference output delay time; and
  a synchronous delay circuit coupled to the reference output buffer circuitry, the synchronous delay circuit providing a reference clock signal to the reference output buffer circuitry, the reference clock signal calibrating the delay time of both the reference output buffer circuitry and the output buffer circuitry to said controllable reference output delay time.

5. The system of claim 1 wherein said communications bus has a bus length and wherein said first and second set of processors are connected spaced along said bus length of said communications bus and wherein said second set of processors are connected to said communications bus substantially near the middle of said bus length.

6. A shared bus multiprocessor system comprising:
  a communications bus;
  a first processor having a first output buffer that has a first output delay time;
  a second processor having a second output buffer that has a second output delay time, said second output delay time greater than said first output delay time; and
  a clock that provides a clock signal to said first processor and said second processor, said clock signal arriving at said second processor before said first processor.

7. The system of claim 6 wherein said second output delay time is greater than said first output delay time by a difference output delay time and said clock signal arrives at said second microprocessor before said first microprocessor by a difference clock time, said difference output delay time being substantially equal to said difference clock time plus a propagation time along said communications bus between said first processor and said second processor.

8. The system of claim 7 wherein said output buffer comprises:
  output buffer circuitry with a controllable delay time;
  reference output buffer circuitry with a controllable reference delay time; and
  a synchronous delay circuit coupled to the reference output buffer circuitry, the synchronous delay circuit providing a reference clock signal to the reference output buffer circuitry, the reference clock signal calibrating the delay time of both the reference output buffer circuitry and the output buffer circuitry to said controllable reference delay time.

9. The system of claim 6 wherein said first and second output buffers each comprise:
  output buffer circuitry with a controllable delay time;
  reference output buffer circuitry with a controllable reference delay time; and
  a synchronous delay circuit coupled to the reference output buffer circuitry, the synchronous delay circuit providing a reference clock signal to the reference output buffer circuitry, the reference clock signal calibrating the delay time of both the reference output buffer circuitry and the output buffer circuitry to said controllable reference delay time.

10. The system of claim 6 further including a third processor, said third processor having a third output delay time substantially equal to said first output delay time, said clock signal arriving at said third processor at substantially the same time as said first processor, further wherein said communications bus has a bus length and wherein said first, second, and third processors are connected spaced along said bus length of said communications bus and wherein said second processor is connected to said communications bus between said first and third processors.

11. The system of claim 10 wherein said second processor is equidistant from said first and third processor.

12. The system of claim 10 wherein said second output delay time is greater than said output delay time by a difference output delay time and said clock signal arrives at said second processor before said first and third processors by a difference clock time, said difference output delay time being substantially equal to said difference clock time plus a propagation time along said communications bus between said second processor and the nearer of said first and third processor.

13. A method for operating a multiprocessor system comprising:
    providing a communications bus for carrying signals between a first processor and a second processor, said first processor having a first output buffer that has a first output delay time, said second processor having a second output buffer that has a second output delay time, said second output delay time greater than said first output delay time; and
    generating a clock signal to said first and second microprocessors, said clock signal arriving at said second microprocessor before said first microprocessor.

14. The method of claim 13 wherein said second output delay time is greater than said first output delay time by a difference output delay time and said clock signal arrives at said second microprocessor before said first microprocessor by a difference clock time, said difference output delay time being substantially equal to said difference clock time plus a propagation time along said communications bus between said first processor and said second processor.

15. A shared bus multiprocessor system comprising:
    a communications bus;
    a first group of processors, each processor in said first group having a first output buffer that has a first output delay time;
    a second group of processors, each processor in said second group having a second output buffer that has a second output delay time, said second output delay time greater than said first output delay time; and
    a clock that provides a clock signal to said first processor and said second processor, said clock signal arriving at said second processor before said first processor.

16. The system of claim 15 wherein said second output delay time is greater than said first output delay time by a difference output delay time and said clock signal arrives at said second microprocessor before said first microprocessor by a difference clock time, said difference output delay time being substantially equal to said difference clock time plus a propagation time along said communications bus between said first processor and said second processor.

17. The system of claim 15 wherein said first and second output buffers each comprise:
    output buffer circuitry with a controllable delay time;
    reference output buffer circuitry with a controllable reference delay time; and
    a synchronous delay circuit coupled to the reference output buffer circuitry, the synchronous delay circuit providing a reference clock signal to the reference output buffer circuitry, the reference clock signal calibrating the delay time of both the reference output buffer circuitry and the output buffer circuitry to said controllable reference delay time.

* * * * *